US007001634B2

(12) United States Patent
Browne

(10) Patent No.: US 7,001,634 B2
(45) Date of Patent: Feb. 21, 2006

(54) PROCESS FOR SUPPRESSING THE FOAMING OF AN AQUEOUS SYSTEM

(75) Inventor: Edward P. Browne, South Charleston, WV (US)

(73) Assignee: Bayer Materialscience LLC, Pittsburgh, PA (US)

( * ) Notice: Subject to any disclaimer, the term of this patent is extended or adjusted under 35 U.S.C. 154(b) by 287 days.

(21) Appl. No.: 10/289,579

(22) Filed: Nov. 7, 2002

(65) Prior Publication Data
US 2004/0091592 A1 May 13, 2004

(51) Int. Cl.
A23L 1/03 (2006.01)

(52) U.S. Cl. ............... 426/329; 426/590; 426/637; 426/615; 426/658; 516/187; 516/113; 516/132; 516/134

(58) Field of Classification Search ............... 426/329; 516/113, 132, 134
See application file for complete search history.

(56) References Cited

U.S. PATENT DOCUMENTS

| | | | | |
|---|---|---|---|---|
| 2,792,308 | A * | 5/1957 | Morse | 426/329 |
| 3,278,457 | A | 10/1966 | Milgrom | 260/2 |
| 3,829,505 | A | 8/1974 | Herold | 260/611 B |
| 3,890,238 | A * | 6/1975 | Boehmer | 252/1 |
| 3,941,849 | A | 3/1976 | Herold | 260/607 A |
| 4,060,501 | A * | 11/1977 | Naylor et al. | 510/221 |
| 4,077,894 | A * | 3/1978 | Langdon et al. | 252/76 |
| 4,287,078 | A * | 9/1981 | Langdon et al. | 252/76 |
| 4,341,656 | A * | 7/1982 | Abel | 516/125 |
| 4,472,560 | A | 9/1984 | Kuyper et al. | 526/120 |
| 4,510,067 | A * | 4/1985 | Ozmeral | 510/422 |
| 4,522,740 | A * | 6/1985 | Schmid et al. | 510/219 |
| 4,548,729 | A * | 10/1985 | Schmid et al. | 510/219 |
| 4,745,231 | A * | 5/1988 | Lange et al. | 568/624 |
| 4,780,237 | A * | 10/1988 | Schmid et al. | 510/422 |
| 4,836,951 | A * | 6/1989 | Totten et al. | 510/220 |
| 4,942,049 | A * | 7/1990 | Schmid et al. | 426/329 |
| 4,976,888 | A * | 12/1990 | De Clercq et al. | 516/132 |
| 5,045,232 | A * | 9/1991 | Dahanayake | 516/117 |
| 5,158,922 | A | 10/1992 | Hinney et al. | 502/175 |
| 5,378,485 | A * | 1/1995 | Mahler et al. | 426/329 |
| 5,470,813 | A | 11/1995 | Le-Khac | 502/175 |
| 5,482,908 | A | 1/1996 | Le-Khac | 502/156 |
| 5,562,862 | A | 10/1996 | Berzansky, Jr. et al. | 252/321 |
| 5,627,122 | A | 5/1997 | Le-Khac et al. | 502/175 |
| 5,639,705 | A | 6/1997 | Bowman et al. | 502/175 |
| 5,725,815 | A * | 3/1998 | Wollenweber et al. | 264/41 |
| 5,844,070 | A | 12/1998 | Hayes et al. | 528/501 |
| 5,977,048 | A | 11/1999 | Welch et al. | 510/365 |
| 6,057,375 | A | 5/2000 | Wollenweber et al. | 516/133 |
| 6,387,962 | B1 * | 5/2002 | Wiggins et al. | 516/134 |
| 6,388,048 | B1 * | 5/2002 | Laycock et al. | 528/412 |
| 6,420,320 | B1 | 7/2002 | McGraw et al. | 508/223 |
| 6,423,661 | B1 | 7/2002 | McGraw et al. | 508/223 |
| 6,696,383 | B1 * | 2/2004 | Le-Khac et al. | 502/175 |
| 2003/0092587 | A1 * | 5/2003 | Gumbel et al. | 510/175 |

FOREIGN PATENT DOCUMENTS

WO 00/26321 5/2000
WO WO 01/90218 * 11/2001

OTHER PUBLICATIONS

Lowe, Belle. 1937. Experimental Cookery. Jlhn Wiley & Sons, Inc., London. p. 14-15.*
U.S. Appl. No. 10/251,155, Double-Metal Cyanide Catalysts Which Can Be Used To Prepare Polyols And The Processes Related Thereto (Mo-6991/LD98-060-PU/MD01-018-PU).

* cited by examiner

Primary Examiner—Carolyn Paden
(74) Attorney, Agent, or Firm—Joseph C. Gil; John E. Mrozinski, Jr.

(57) ABSTRACT

The present invention relates to a process for suppressing the foaming of an aqueous system which involves combining water and at least one defoamer composition which has a hydroxyl equivalent molecular weight of at least 4000 Da and a cloud point less than or equal to 30° C. in 1% aqueous solution.

The high hydroxyl equivalent molecular weight defoamers of the present invention exhibit excellent defoaming properties at a low cloud point. Additionally, defoamers of the present invention exhibit defoaming properties which are better than those of defoamers having the same cloud point which are based on polyoxyalkylene copolymers prepared in the presence of potassium hydroxide.

The superior defoaming properties of the defoamers of the present invention are particularly useful in the manufacture or processing of food items.

41 Claims, No Drawings

PROCESS FOR SUPPRESSING THE FOAMING OF AN AQUEOUS SYSTEM

FIELD OF THE INVENTION

The present invention relates to a process for suppressing the foaming of an aqueous system which involves combining water and at least one defoamer composition which has a hydroxyl equivalent molecular weight of at least 4000 Da and a cloud point less than or equal to 30° C. in 1% aqueous solution.

The term "defoamer" is used herein to mean a composition which can be used to control foam in aqueous systems. The term "defoaming" is used herein to refer to the ability of the defoamer to control and/or reduce foam in aqueous systems.

BACKGROUND OF THE INVENTION

In various industrial processes, water is widely used as a medium in which materials are temporarily suspended or dissolved. Under processing conditions such as, for example, harsh agitation, mechanical shear, filtering or boiling, certain aqueous systems can entrain air, which results in a foaming of the aqueous medium. Foaming decreases processing efficiency and/or can yield unacceptable products.

In the industrial manufacture or processing of foods, for example, considerable significance is attached to the control and prevention of foaming. For instance, in the industrial processing of sugar-containing plant juices (which is practiced on a large scale in the production of sugar from sugar beets), certain difficulties are caused by excessive foaming at the juice recovery and purification stage. Excessive foaming also occurs during the manufacture of potato products. Defoamers used in the food industry must, of course, be physiologically safe. Additionally, defoaming agents used in the potato-processing industry must be capable of regulating starch foam.

Dispersions of solid particles in water insoluble organic liquids have been widely used for controlling foam in aqueous systems. Such dispersions usually contain surface active agents which facilitate the spread of the dispersions to the interface of the aqueous system.

Defoamers have been used as surface active agents for many years. Specifically, defoamers which are based on polyoxyalkylene copolymers (for example, triblock copolymers of ethylene oxide ("EO"), propylene oxide ("PO") and EO or of EO, butylene oxide ("BO") and PO) are known. In general, these defoamers have both hydrophobic and hydrophilic blocks. At increased temperatures, these defoamers are insoluble in solution, thereby causing an increase of the surface tension of the system, which results in foam collapse.

The "cloud point" is a well-known term which refers to the temperature at which the defoamer becomes insoluble in solution. At this temperature, a second phase is observed (i.e, the solution becomes cloudy). Thus, at temperatures above the cloud point for a given system, the defoamer acts as an insoluble surfactant, thereby displaying "defoaming" properties. At temperatures below the cloud point, however, the defoamer becomes soluble in solution, thereby reducing the surface tension of the system.

As mentioned above, defoamers for aqueous systems are known. See, for example, U.S. Pat. Nos. 6,387,962 and 6,057,375. Specifically, defoamers which are prepared in the presence of a basic catalyst (such as potassium hydroxide (KOH)) are known. See, for example, U.S. Pat. No. 6,057,375.

UCON 50-HB-5100, which is commercially available from Dow Chemical Company, is an example of a high molecular weight defoamer which is based on polyoxyalkylene copolymers prepared in the presence of KOH. Specifically, UCON 50-HB-5100 is a butyl ether of an EO/PO glycol which contains about 50 wt. %, based on the total weight of the butyl ether, of an EO cap. UCON 50-HB-5100 has a hydroxyl equivalent molecular weight of about 3930 Da, an average hydroxyl number of about 16 mgKOH/g and a viscosity of about 1100 cSt at 40° C. UCON 50-HB-5100, however, has a high cloud point, i.e., a cloud point (1% aqueous solution) of about 50° C.

Another known defoamer which is prepared in the presence of KOH is PLURONIC L-61. PLURONIC L-61, which is commercially available from BASF Corporation, is an example of a low hydroxyl equivalent molecular weight defoamer which is based on polyoxyalkylene copolymers prepared in the presence of KOH. Specifically, PLURONIC L-61 is a butyl ether of an EO/PO glycol which does not contain any internal EO but which contains about 13 wt. %, based on the total weight of the butyl ether, of an EO cap. PLURONIC L-61 has a hydroxyl equivalent molecular weight of about 1000 Da, an average hydroxyl number of about 56 mgKOH/g and a cloud point (1% aqueous) of about 24° C. While PLURONIC L-61 does have a low cloud point, it also has a low hydroxyl equivalent molecular weight.

Known defoamers which are based on polyoxyalkylene copolymers (such as UCON 50-HB-5100 and PLURONIC L-61), are prepared by oxyalkylating a low molecular weight starter compound (such as propylene glycol, glycerin or butanol) with PO and/or EO in the presence of a basic catalyst (such as KOH) to form a polyoxyalkylene defoamer.

In base-catalyzed oxyalkylation reactions, PO and certain other alkylene oxides are subject to a competing internal rearrangement which generates unsaturated alcohols. For example, when KOH is used to catalyze an oxyalkylation reaction using PO, the resulting product will contain allyl alcohol-initiated, monofunctional impurities. As the molecular weight of the polyol increases, the isomerization reaction becomes more prevalent. As a result, poly(propylene oxide) products having a hydroxyl equivalent molecular weight of 800 Da or higher prepared using KOH tend to have significant quantities of monofunctional impurities.

It is known, however, that when PO is used for addition polymerization in the presence of KOH, a monol having an unsaturated group at the terminal chain is increasingly produced as a by-product as the polyoxypropylene polyol increases in molecular weight. The practical result of this is that it is very difficult to prepare polyoxypropylene polyols having a hydroxyl equivalent molecular weight greater than 3000 in an anionic polymerization reaction catalyzed with KOH.

For these and other reasons, polyoxypropylene polyols are often capped with EO groups. For example, a polyoxypropylene triol having a molecular weight of about 4200 Da, prepared in the presence of KOH, can be capped with EO by adding EO rather than PO during the last stage of oxyalkylation. Adding EO to produce a triol having a molecular weight of about 6000 Da (30% EO cap) will introduce polyoxyethylene terminated molecules having more primary hydroxyl groups. This procedure, however, has several drawbacks. One of these drawbacks is that the large amount of polyoxyethylene content considerably alters important properties such as hydrophobicity and hygroscopicity and may confer often unwanted surfactant properties by establishing or altering hydrophile/lipophile balance.

Unlike basic catalysts, double metal cyanide ("DMC") catalysts do not significantly promote the isomerization of propylene oxide. As a result, DMC catalysts can be used to prepare polyols which have low unsaturation values and relatively high molecular weights.

Surprisingly, I discovered that high hydroxyl equivalent molecular weight defoamers based on polyoxyalkylene copolymers prepared in the presence of a catalyst, preferably, a DMC catalyst, exhibit excellent defoaming properties at a low cloud point. Additionally, I discovered that high hydroxyl equivalent molecular weight defoamers based on polyoxyalkylene copolymers prepared in the presence of a catalyst, preferably, a DMC catalyst, exhibit defoaming properties which are better than those of defoamers having the same cloud point which are based on polyoxyalkylene copolymers prepared in the presence of KOH.

SUMMARY OF THE INVENTION

The object of the present invention is to provide a process for suppressing the foaming of an aqueous system which involves combining water and at least one defoamer composition which has a hydroxyl equivalent molecular weight of at least 4000 Da and a cloud point less than or equal to 30° C. in 1% aqueous solution.

DESCRIPTION OF THE INVENTION

In a first aspect, the present invention is a process for suppressing the foaming of an aqueous system which involves combining A) water and B) at least one defoamer composition which contains the reaction product of i) at least one starter compound which has active hydrogen atoms; and ii) at least one alkylene oxide or a mixture or mixtures of oxides, wherein i) and ii) have been reacted in the presence of at least one catalyst and wherein the defoamer has a hydroxyl equivalent molecular weight of at least 4000 Da and a cloud point less than or equal to 30° C. in 1% aqueous solution.

In another aspect, the present invention is a process for preparing a food item which involves combining A) water and B) at least one defoamer composition which contains the reaction product of i) at least one starter compound which has active hydrogen atoms; and ii) at least one alkylene oxide or a mixture or mixtures of oxides; and C) at least one item which is suitable for human consumption, wherein i) and ii) have been reacted in the presence of at least one catalyst and wherein the defoamer has a hydroxyl equivalent molecular weight of at least 4000 Da and a cloud point less than or equal to 30° C. in 1% aqueous solution.

Any starter compound can be used in the present invention. Examples of starter compounds which can be used in the present invention include, for example, water, propylene glycol, dipropylene glycol, tripropylene glycol, neopentyl glycol, diethylene glycol, triethylene glycol, glycerine, trimethylol propane, sorbitol, methanol, ethanol, butanol, polyoxypropylene polyols, polyoxyethylene polyols, alkoxylated allylic alcohols and mixtures thereof.

Any oxide can be used in the present invention. Examples of oxides which can be used in the present invention include, for example, ethylene oxide, propylene oxide, butylene oxide, styrene oxide and mixtures thereof. Alkoxylation can be accomplished using only one monomeric oxide; randomly; or blockwise with 2 or 3 different monomeric oxides.

Any catalyst that has a low tendency to form allyl by-products can be used in the present invention. For example, catalysts which contain calcium having counterions of carbonate and a $C_{6-10}$ alkanoate in a solvent which does not contain active hydrogen atoms, as disclosed in U.S. Pat. Nos. 6,420,320 and 6,423,661, can be used in the present invention. Preferably, DMC catalysts are used in the present invention.

DMC catalysts which are useful in the present invention can be prepared by combining i) at least one metal salt (such as, for example, zinc chloride); with ii) at least one metal cyanide salt (such as, for example, potassium hexacyanocobaltate (III); in the presence of iii) at least one organic complexing ligand (such as, for example, tert-butanol); and optionally, iv) at least one functionalized polymer (such as, for example, a polyether polyol) under conditions sufficient to form a catalyst.

Examples of DMC catalysts which are useful in the present invention are described in, for example, U.S. Pat. Nos. 3,278,457, 3,829,505, 3,941,849, 4,472,560, 5,158,922, 5,470,813, 5,627,122 and 5,482,908, as well as in U.S. patent application Ser. No. 10/251,155, which was filed on Sep. 20, 2002.

The process of the present invention is suitable for use with various forms of DMC catalysts, including, for example, powders, pastes (See, for example, U.S. Pat. No. 5,639,705) and suspensions (See for example, U.S. Pat. No. 4,472,560).

Defoamers of the present invention can be prepared by combining at least one starter compound with at least one oxide or a mixture or mixtures of oxides, in the presence of at least one DMC catalyst. Preferably, the starter compound is combined with mixtures of PO and EO.

Preferably, the combination occurs in a reactor at temperatures in the range of from about 60° C. to about 250° C., preferably, from about 80° C. to about 180° C., more preferably, from about 90° C. to about 140° C. The reaction can be carried out under an overall pressure of 0.0001 to 20 bar. Additionally, the polyaddition can be carried out in bulk or an inert organic solvent, such as toluene and/or tetrahydrofuran ("THF"). The amount of solvent is usually from 0 to 30 wt. %, based on the total weight of the defoamer to be prepared.

Enough oxide is usually added to activate the DMC catalyst. Typically, DMC catalyst activation is indicated when the pressure in the reactor decreases, thereby indicating that the oxide is being consumed.

Preferably, the starter compound is stripped before it is reacted with the oxide. The stripping step is typically performed with both the starter compound and DMC catalyst present. Stripping is preferably performed under vacuum as disclosed in, for example, U.S. Pat. No. 5,844,070.

Preferred stripping methods include inert gas sparging combined with vacuum stripping, wiped-film evaporation, vacuum stripping in the presence of an organic solvent and the like. The temperature at which stripping is performed is not critical. Preferably, stripping is performed at a temperature within the range of from about 60° C. to about 200° C., more preferably, from about 80° C. to about 150° C. Stripping is performed at reduced pressure (less than 760 mm Hg). Preferably, stripping is performed at reactor pressures less than about 300 mm, more preferably, less than about 200 mm.

Reducing the water content of the starter compound by stripping offers faster catalyst activation. Preferably, the water content of the starter compound is reduced to less than about 100 ppm, more preferably, to less than about 50 ppm. The water content of the starter compound can also be reduced by other methods known to those skilled in the art.

The oxide concentration in the reactive mixture can be increased during alkoxylation as the molecular weight of the defoamer increases.

In one embodiment of the present invention, alkoxylation is accomplished such that the defoamer contains from about 70 to about 90 wt. %, based on the total weight of the defoamer, of PO and from about 10 to about 30 wt. %, based on the total weight of the defoamer, of EO.

In another embodiment of the present invention, alkoxylation is accomplished such that the defoamer contains a first section, which represents about 23 wt. % of the defoamer (based on the total weight of the defoamer), which has about 100 wt. %, based on the total weight of the first section, of PO; an intermediate section, which represents about 37 wt. % of the defoamer (based on the total weight of the defoamer), which has from about 10 to about 20 wt. %, based on the total weight of the intermediate section, of EO and from about 80 to about 90 wt. %, based on the total weight of the intermediate section, of PO; and a final section, which represents about 40 wt. % of the defoamer (based on the total weight of the defoamer), which has from about 30 to about 50 wt. %, based on the total weight of the final section, of PO and from about 50 to about 70 wt. %, based on the total weight of the final section, of EO.

Defoamers of the present invention have a hydroxyl equivalent molecular weight of at least 4000 Da, preferably, about 5000 Da, more preferably, about 7000 Da. Defoamers of the present invention have a cloud point (1% aqueous) which is less than or equal to 30° C. Preferably, defoamers of the present invention have a cloud point (1% aqueous) which is within the range of from about 10° C. to about 25° C. More preferably, defoamers of the present invention have a cloud point (1% aqueous) of about 17° C.

The superior defoaming properties of the defoamers of the present invention are particularly useful in the manufacture or processing of food items.

The following examples merely illustrate the invention. Those skilled in the art will recognize many variations that are within the spirit of the invention and scope of the claims.

EXAMPLES

The following compositions were used in the examples:

Defoamer A: an EO/PO alkoxylate of butanol which was prepared in the presence of a DMC catalyst (prepared according to U.S. Pat. No. 5,482,908, the teachings of which are incorporated herein by reference) and which contains about 18 wt. %, based on the total weight of the defoamer, of EO and which has a hydroxyl equivalent molecular weight of about 7000 Da, an average hydroxyl number of about 8 mgKOH/g and a cloud point (1% aqueous) of about 17° C.; and Defoamer B: a butyl ether of an EO/PO glycol which has been prepared in the presence of KOH, which does not contain any internal EO but which contains about a 13 wt. %, based on the total weight of the butyl ether, EO cap and which has a hydroxyl equivalent molecular weight of about 1000 Da, an average hydroxyl number of about 56 mgKOH/g and a cloud point (1% aqueous) of about 17° C.

Example 1 (Control)

To determine normalized foam height (N), three separate aqueous solutions were prepared. The first solution was an aqueous solution containing about 20 wt. %, based on the total weight of the solution, of potato pulp. The second solution was an aqueous solution containing about 20 wt. %, based on the total weight of the solution, of sugar beet pulp. The third solution was an aqueous solution containing about 500 ppm of a dishwashing detergent which is commercially sold by Colgate-Palmolive Company under the tradename PALMOLIVE. Each solution was added to its own glass jar At 25° C., each jar was shaken vigorously for one minute. After three minutes settling time, the height of the foam was measured for each solution and expressed as a percentage of the height of the aqueous solution. This is referred to as the normalized foam height (N). The foam height was measured from the liquid surface to the top of the foam layer in the center of each glass jar. The foam height close to the walls of the container was slightly higher than the foam height in the center of each glass jar. The normalized foam height (N) of each solution is illustrated in Table 1.

TABLE 1

Normalized foam heights of each solution:

| Solution* | Potato pulp in water | Sugar beet pulp in water | PALMOLIVE in water |
|---|---|---|---|
| Normalized Foam Height (N) (expressed as a percentage of the liquid height) | 81% | 33% | 800% |

*Control

Example 2

The procedure of control Example 1 was followed, except that Defoamer A was added to each solution. The defoaming efficiency of Defoamer A is illustrated in Table 2.

TABLE 2

Defoaming efficiency of Defoamer A.

| Solution | Potato pulp in water | Sugar beet pulp in water | PALMOLIVE in water |
|---|---|---|---|
| Concentration of Defoamer A | 10 ppm | 10 ppm | 500 ppm |
| Normalized Foam Height (N) (expressed as a percentage of the liquid height) | 41% | 0% | 100% |
| Defoaming efficiency* | 49% | 100% | 88% |

*calculated as follows: $(N_{of\ control\ Example\ 1} - N_{of\ Example\ 2})/N_{of\ control\ Example\ 1}$ Comparative Example 3

The procedure of control Example 1 was followed, except that Defoamer B was added to each solution. The defoaming efficiency of Defoamer B is illustrated in Table 3.

TABLE 3

Defoaming efficiency of Defoamer B
(not according to the invention):

| Solution* | Potato pulp in water | Sugar beet pulp in water | PALMOLIVE in water |
|---|---|---|---|
| Concentration of Defoamer B (not according to the invention) | 10 ppm | 10 ppm | 500 ppm |
| Normalized Foam Height (N) (expressed as a percentage of the liquid height) | 58% | 9% | 600% |
| Defoaming efficiency** | 28% | 72% | 25% |

**calculated as follows: ($N_{of\ control\ Example\ 1} - N_{of\ Example\ 3}$)/$N_{of\ control\ Example\ 1}$
*Comparative As illustrated by the data contained in Table 2, defoamers of the present invention exhibit excellent defoaming properties at a low cloud point. Additionally, as illustrated by the data contained in Tables 2 and 3, defoamers of the present invention exhibit defoaming properties which are better than those of defoamers having the same cloud point which are based on polyoxyalkylene copolymers prepared in the presence of KOH.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for suppressing the foaming of an aqueous system comprising:
   combining:
   A) water; and
   B) at least one defoamer composition comprising the reaction product of:
      i) at least one starter compound which has active hydrogen atoms; and
      ii) at least one alkylene oxide chosen from ethylene oxide, propylene oxide, butylene oxide and a mixture or mixtures thereof;
   wherein i) and ii) have been reacted in the presence of at least one catalyst and wherein the defoamer has a hydroxyl equivalent molecular weight of at least 4000 Da and a cloud point less than or equal to 30° C. in 1% aqueous solution, and wherein propylene oxide is present in the defoamer in an amount within the range of from about 70 to about 90 wt. %, based on the total weight of the defoamer and ethylene oxide is present in the defoamer in an amount within the range of from about 10 to about 30 wt. %, based on the total weight of the defoamer.

2. The process of claim 1 in which the defoamer has a hydroxyl equivalent molecular weight of about 5000 Da.

3. The process of claim 1 in which the defoamer has a hydroxyl equivalent molecular weight of about 7000 Da.

4. The process of claim 1 in which the starter compound is butanol.

5. The process of claim 1 in which the alkylene oxide is ethylene oxide, propylene oxide or butylene oxide or a mixture or mixtures thereof.

6. The process of claim 1 in which the catalyst is a double metal cyanide catalyst.

7. The process of claim 6 in which the double metal cyanide catalyst is prepared by combining i) at least one metal salt; with ii) at least one metal cyanide salt; in the presence of iii) at least one organic complexing ligand; and iv) optionally, at least one functionalized polymer.

8. The process of claim 6 in which the double metal cyanide catalyst is zinc hexacyanocobaltate (III).

9. The process of claim 1 in which the catalyst comprises calcium having counterions of carbonate and a $C_{6-10}$ alkanoate in a solvent which does not contain active hydrogen atoms.

10. The process of claim 1 in which the defoamer has a cloud point of about 17° C. in 1% aqueous solution.

11. The process of claim 1 in which the aqueous system contains at least one item which is suitable for human consumption.

12. A process for suppressing the foaming of an aqueous system containing at least one item which is suitable for human consumption chosen from a sugar beet, a potato and molasses, the process comprising combining:
   A) water; and
   B) at least one defoamer composition comprising the reaction product of:
      i) at least one starter compound which has active hydrogen atoms; and
      ii) at least one alkylene oxide chosen from ethylene oxide, propylene oxide, butylene oxide and a mixture or mixtures thereof;
   wherein i) and ii) have been reacted in the presence of at least one catalyst and wherein the defoamer has a hydroxyl equivalent molecular weight of at least 4000 Da and a cloud point less than or equal to 30° C. in 1% aqueous solution, and wherein propylene oxide is present in the defoamer in an amount within the range of from about 70 to about 90 wt. %, based on the total weight of the defoamer and ethylene oxide is present in the defoamer in an amount within the range of from about 10 to about 30 wt. %, based on the total weight of the defoamer.

13. The process of claim 12 in which the defoamer has a hydroxyl equivalent molecular weight of about 5000 Da.

14. The process of claim 12 in which the defoamer has a hydroxyl equivalent molecular weight of about 7000 Da.

15. The process of claim 12 in which the starter compound is butanol.

16. The process of claim 12 in which the alkylene oxide is ethylene oxide, propylene oxide or butylene oxide or a mixture or mixtures thereof.

17. The process of claim 12 in which the catalyst is a double metal cyanide catalyst.

18. The process of claim 17 in which the double metal cyanide catalyst is prepared by combining i) at least one metal salt; with ii) at least one metal cyanide salt; in the presence of iii) at least one organic complexing ligand; and iv) optionally, at least one functionalized polymer.

19. The process of claim 17 in which the double metal cyanide catalyst is zinc hexacyanocobaltate (III).

20. The process of claim 12 in which the catalyst comprises calcium having counterions of carbonate and a $C_{6-10}$ alkanoate in a solvent which does not contain active hydrogen atoms.

21. The process of claim 12 in which the defoamer has a cloud point of about 17° C. in 1% aqueous solution.

22. In a process for preparing a food item comprising: combining:
   A) water;
   B) at least one defoamer composition comprising the reaction product of:
      i) at least one starter compound which has active hydrogen atoms; and
      ii) at least one alkylene oxide or a mixture or mixtures of oxides; and
   C) at least one item which is suitable for human consumption chosen from a sugar beet, a potato or molasses;

wherein i) and ii) have been reacted in the presence of at least one catalyst and wherein the defoamer has a hydroxyl equivalent molecular weight of at least 4000 Da and a cloud point less than or equal to 30° C. in 1% aqueous solution.

23. The process of claim 22 in which the defoamer has a hydroxyl equivalent molecular weight of about 5000 Da.

24. The process of claim 22 in which the defoamer has a hydroxyl equivalent molecular weight of about 7000 Da.

25. The process of claim 22 in which the starter compound is butanol.

26. The process of claim 22 in which the alkylene oxide is ethylene oxide, propylene oxide or butylene oxide or a mixture or mixtures thereof.

27. The process of claim 22 in which the catalyst is a double metal cyanide catalyst.

28. The process of claim 27 in which the double metal cyanide catalyst is prepared by combining i) at least one metal salt; with ii) at least one metal cyanide salt; in the presence of iii) at least one organic complexing ligand; and iv) optionally, at least one functionalized polymer.

29. The process of claim 27 in which the double metal cyanide catalyst is zinc hexacyanocobaltate (III).

30. The process of claim 22 in which the catalyst comprises calcium having counterions of carbonate and a $C_{6-10}$ alkanoate in a solvent which does not contain active hydrogen atoms.

31. The process of claim 22 in which the defoamer has a cloud point of about 17° C. in 1% aqueous solution.

32. In a process for preparing a food item chosen from sugar, potato chips, French fries and baker's yeast, the process comprising comprising:
   combining:
      A) water;
      B) at least one defoamer composition comprising the reaction product of:
         i) at least one starter compound which has active hydrogen atoms; and
         ii) at least one alkylene oxide or a mixture or mixtures of oxides; and
      C) at least one item which is suitable for human consumption;
   wherein i) and ii) have been reacted in the presence of at least one catalyst and wherein the defoamer has a hydroxyl equivalent molecular weight of at least 4000 Da and a cloud point less than or equal to 30° C. in 1% aqueous solution.

33. The process of claim 32 in which the defoamer has a hydroxyl equivalent molecular weight of about 5000 Da.

34. The process of claim 32 in which the defoamer has a hydroxyl equivalent molecular weight of about 7000 Da.

35. The process of claim 32 in which the starter compound is butanol.

36. The process of claim 32 in which the alkylene oxide is ethylene oxide, propylene oxide or butylene oxide or a mixture or mixtures thereof.

37. The process of claim 32 in which the catalyst is a double metal cyanide catalyst.

38. The process of claim 37 in which the double metal cyanide catalyst is prepared by combining i) at least one metal salt; with ii) at least one metal cyanide salt; in the presence of iii) at least one organic complexing ligand; and iv) optionally, at least one functionalized polymer.

39. The process of claim 37 in which the double metal cyanide catalyst is zinc hexacyanocobaltate (III).

40. The process of claim 32 in which the catalyst comprises calcium having counterions of carbonate and a $C_{6-10}$ alkanoate in a solvent which does not contain active hydrogen atoms.

41. The process of claim 32 in which the defoamer has a cloud point of about 17° C. in 1% aqueous solution.

* * * * *